(12) United States Patent
Gibson et al.

(10) Patent No.: US 11,484,743 B2
(45) Date of Patent: Nov. 1, 2022

(54) MAGNETIC BRAKE FOR AN EXERCISE EQUIPMENT

(71) Applicant: Mad Dogg Athletics, Inc., Venice, CA (US)

(72) Inventors: Ron Gibson, Santa Clarita, CA (US); John Baudhuin, Santa Monica, CA (US)

(*) Notice: Subject to any disclaimer, the term of this patent is extended or adjusted under 35 U.S.C. 154(b) by 4 days.

(21) Appl. No.: 16/889,742

(22) Filed: Jun. 1, 2020

(65) Prior Publication Data

US 2020/0376317 A1 Dec. 3, 2020

Related U.S. Application Data

(60) Provisional application No. 62/855,878, filed on May 31, 2019.

(51) Int. Cl.
*A63B 21/00* (2006.01)
*F16D 49/00* (2006.01)
(Continued)

(52) U.S. Cl.
CPC ...... *A63B 21/00192* (2013.01); *A63B 21/015* (2013.01); *A63B 21/225* (2013.01);
(Continued)

(58) Field of Classification Search
CPC ............. A63B 21/00; A63B 21/00047; A63B 21/00058; A63B 21/00076; A63B 21/00181; A63B 21/028; A63B 21/00189; A63B 21/00192; A63B 21/005; A63B 21/00196; A63B 21/0051; A63B 21/0052; A63B 21/0056; A63B 21/0057; A63B 21/0058; A63B 21/0059; A63B 21/012; A63B 21/0125; A63B 21/015; A63B 21/02; A63B 21/021; A63B 21/22; A63B 21/222; A63B 21/225; A63B 21/227; A63B 22/00; A63B 22/0002; A63B 22/0005; A63B 22/0007; A63B 22/0012; A63B 22/0015; A63B 22/0017; A63B 22/0025; A63B 22/0046; A63B 22/06; A63B 22/0605; A63B 22/0664; A63B 22/20; A63B 2022/0611; A63B 2022/0617; A63B 2022/0623; A63B 2022/0629; A63B 2022/0635; A63B 2022/0641;
(Continued)

(56) References Cited

U.S. PATENT DOCUMENTS 4,364,557 A * 12/1982 Serati ............... A63B 71/06
482/65
5,466,203 A * 11/1995 Chen ............... A63B 21/0051
482/57
(Continued)

*Primary Examiner* — Megan Anderson
*Assistant Examiner* — Thao N Do
(74) *Attorney, Agent, or Firm* — WPAT Law, P.C.; Anthony King

(57) ABSTRACT

An indoor exercise bicycle having a magnetic brake. The magnetic brake system has a pair of parallel arms each having a set of magnets. The pair of parallel arms moves along a track in a radial direction relative to the axis of the flywheel. The pair of parallel arms move toward and away from the flywheel not via a pivoting action. Instead, the pair of parallel arms moves linearly towards and away from the flywheel.

18 Claims, 15 Drawing Sheets

(51) Int. Cl.
*H02K 49/04* (2006.01)
*A63B 21/015* (2006.01)
*A63B 22/06* (2006.01)
*A63B 21/22* (2006.01)

(52) U.S. Cl.
CPC .......... *A63B 22/0605* (2013.01); *F16D 49/00* (2013.01); *H02K 49/046* (2013.01)

(58) Field of Classification Search
CPC .... A63B 2022/0647; A63B 2022/0652; A63B 2022/0658; A63B 2022/067; A63B 2022/0676; A63B 2022/0682; A63B 2022/0688; A63B 69/16; A63B 2069/161; A63B 2069/162; A63B 2069/163; A63B 2069/164; A63B 2069/165; A63B 2069/166; A63B 2069/167; A63B 2069/168; A63B 23/00; A63B 23/04; A63B 23/0476; F16D 2129/08; F16D 2125/48
USPC .......................................................... 482/64
See application file for complete search history.

(56) References Cited

U.S. PATENT DOCUMENTS

| | | | | |
|---|---|---|---|---|
| 6,491,606 | B1 * | 12/2002 | Swift | A63B 22/0605 482/65 |
| D473,602 | S * | 4/2003 | Baudhuin | D21/667 |
| 7,901,334 | B2 * | 3/2011 | Chen | A63B 21/4049 482/63 |
| 8,052,581 | B1 * | 11/2011 | Lohr | A63B 21/015 482/63 |
| D677,349 | S * | 3/2013 | Baudhuin | D21/667 |
| D677,746 | S * | 3/2013 | Baudhuin | D21/667 |
| 8,585,561 | B2 | 11/2013 | Watt | |
| D709,566 | S * | 7/2014 | Baudhuin | D21/667 |
| 9,492,700 | B1 * | 11/2016 | Wu | A63B 21/015 |
| 9,593,992 | B2 * | 3/2017 | Wu | G01L 3/10 |
| 10,220,260 | B2 * | 3/2019 | Chang | G01D 5/145 |
| 10,561,878 | B2 * | 2/2020 | Wu | A63B 21/22 |
| 10,688,344 | B2 * | 6/2020 | Wu | A63B 21/015 |
| 10,695,613 | B2 * | 6/2020 | Chang | A63B 21/00069 |
| 2002/0168792 | A1 * | 11/2002 | Goldberg | A63B 22/0605 438/57 |
| 2003/0064863 | A1 * | 4/2003 | Chen | A63B 21/0051 482/51 |
| 2012/0088638 | A1 | 4/2012 | Lull | |
| 2013/0203563 | A1 * | 8/2013 | Chen | A63B 22/0605 482/63 |
| 2014/0013861 | A1 * | 1/2014 | Wu | G01L 3/101 73/862.08 |
| 2016/0310785 | A1 * | 10/2016 | Lo | A63B 21/015 |
| 2017/0036053 | A1 * | 2/2017 | Smith | A63B 21/015 |
| 2017/0239506 | A1 * | 8/2017 | Gibson | A63B 71/0054 |
| 2017/0312581 | A1 * | 11/2017 | Chang | A63B 22/0605 |
| 2018/0207468 | A1 * | 7/2018 | Golesh | A63B 21/015 |
| 2018/0369643 | A1 * | 12/2018 | Huang | A63B 21/0051 |
| 2019/0192914 | A1 * | 6/2019 | Langford | A63B 21/00196 |
| 2019/0217144 | A1 * | 7/2019 | Petrillo | A63B 22/0605 |
| 2020/0121981 | A1 * | 4/2020 | Wu | A63B 21/00069 |
| 2020/0147449 | A1 * | 5/2020 | Liu | A63B 21/225 |
| 2020/0376325 | A1 * | 12/2020 | Yu | A63B 22/0664 |

* cited by examiner

MAGNETIC BRAKE FOR AN EXERCISE EQUIPMENT

CROSS-REFERENCE TO RELATED APPLICATIONS

This application claims priority to, and is a Non-Provisional patent application of, U.S. provisional patent application No. 62/855,878, filed on May 31, 2019, which are hereby incorporated by reference in their entirety. The 12-months deadline to file a non-provisional patent application fell on a Sunday, thereby extending the deadline to the following Monday, Jun. 1, 2020.

FIELD OF THE DISCLOSURE

The present disclosure relates to exercise equipment, and more particularly, a magnetic brake to an indoor cycle.

BACKGROUND OF THE DISCLOSURE

Indoor stationary exercise bicycles have been available for nearly three decades. As originally designed, they are summarized by several key attributes. One is the use of a "fixed gear" drivetrain, where the pedals/crank is always engaged with a perimeter-weighted flywheel with no free-wheeling possible. A second is multiple, easy adjustability of seat and handlebars positions to allow a variety of user body sizes and positions on the equipment. The third is the use of a user-controlled resistance means to allow varying levels of "work" demanded of the rider. Virtually all early designs used variations of a friction brake that pressed single or multiple brake pad(s) against the flywheel to achieve that resistance. As time passed, some manufacturers adapted non-contact resistance methods, most notably using the well-known "eddy current" technology of a magnetic field source in variable proximity to a non-ferrous rotating portion of the flywheel. The advantages of this technology are several, most notably the absence of resistance brake pads and their wear over time, and also their near noiseless operation. The disadvantages are mostly the higher costs of the associated components, and the difficulty of having a true perimeter-weighted flywheel.

There is a continuing need for new ways to make and use a magnetic brake.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned desires. Although the present embodiments may obviate one or more of the above-mentioned desires, it should be understood that some aspects of the embodiments might not necessarily obviate them.

BRIEF SUMMARY OF THE DISCLOSURE

Known magnetic brake patents are the "Lull" patent (U.S. Pat. No. 9,044,635 B2) and the "Watt" patent (U.S. Pat. No. 8,585,562 B2), both of which are herein incorporated by reference in their entireties. These two disclosures detail similar but slightly different methods of having a pivoting brake arm with magnets that can be moved from a position of non-overlap to a position of overlap of the non-ferrous portion of the flywheel, thus providing a variable non-contact resistance means. The dis-advantage of those two designs is that the added perimeter weight must reside considerably inboard of the outer edge of the flywheel, thus reducing the desired "perimeter weighted feel."

In one embodiment of the current disclosure, the contemplated magnetic brake can operate with a range of resistance from near zero to an acceptable maximum resistance.

In another embodiment of the current disclosure, the contemplated magnetic brake can have a reasonable amount of perimeter-weighted inertia as typical friction brake exercise bikes.

In yet another embodiment of the current disclosure, the contemplated magnetic brake can have magnetic brake arm that moves not in a pivoting fashion, but in a linear path. This can have the advantage of having the resistance curve be very linear throughout its travel range, where the pivoting designs of others tend to have a very narrow range between low resistance and high resistance. It can also have the advantage of being designed in a "modular cassette" so that much of the pre-assembly of critical tolerance parts can be done before attaching to the exercise bike. This can also make servicing/replacing of the system much easier to do by less skilled technicians.

In yet another embodiment, the flywheel diameter has been increased so that the "swept area" of the flywheel can cover more distance per revolution, making the braking resistance higher for a given flywheel rpm, and allowing the perimeter weights to be located further away from the flywheel axle than on competitive designs, giving more inertial feel.

Another embodiment can have the magnets approaching the flywheel radially. Further embodiments can have the magnets approaching the flywheel tangentially, both following a straight, linear path. For example, a design can be made where linear tracks are provided for a similar modular brake arm sub-assembly to slide in and out in a tangential direction 175 as shown in FIG. 2.

In still another embodiment can have a mechanical rotating adjustment knob while other embodiments can use a motor to vary the brake arm position.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

Figure 1:
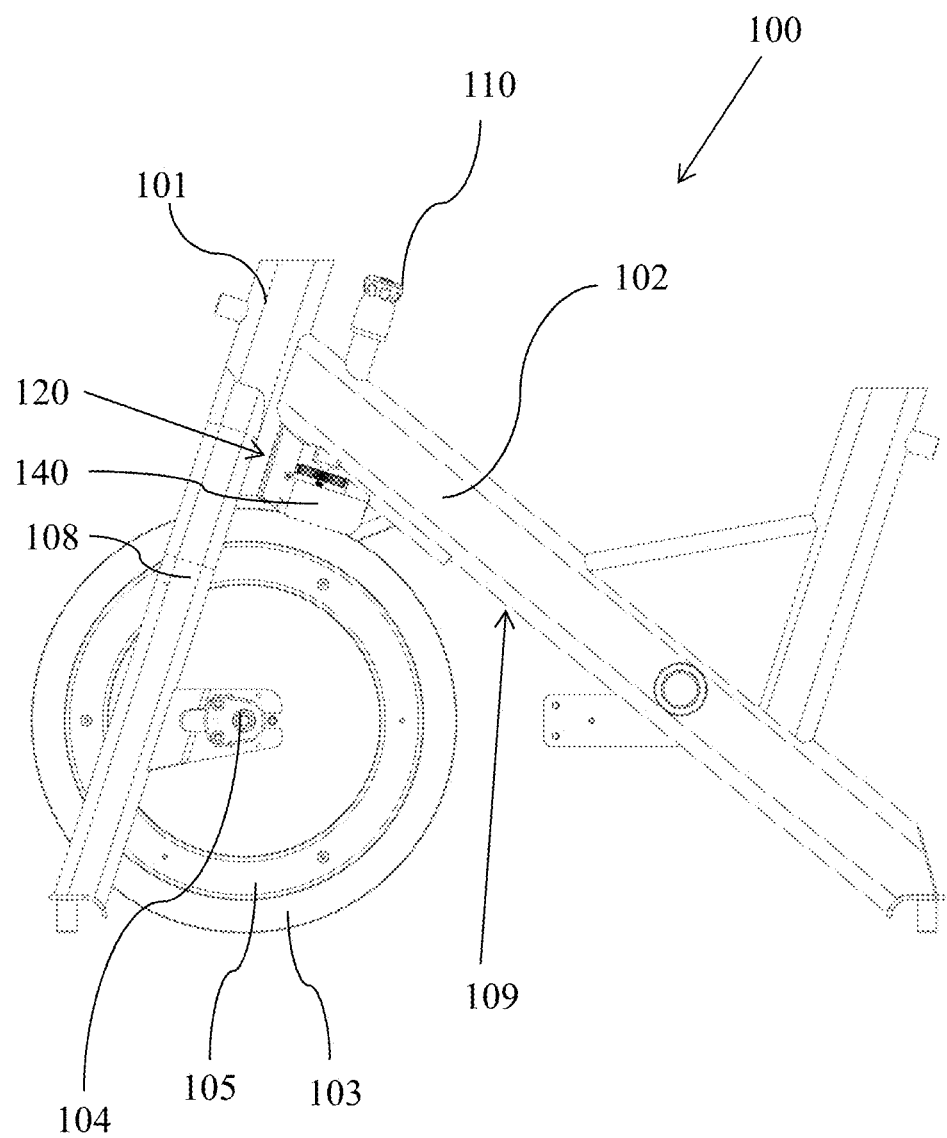
FIG. 1 illustrates a left side view of an indoor cycle having a bike frame, a flywheel, and one embodiment of the contemplated magnetic brake.

The following call-out list of elements in the drawing can be a useful guide when referencing the elements of the drawing figures:
100 Exercise Bicycle
101 Head Tube
102 Down Tube
103 Flywheel
104 Axis of Flywheel
105 Weight
106 Bike Frame
107 Hole of the Down Tube
108 Fork
109 Bottom Side of Down Tube
110 Resistance Knob
111 Control Rod
112 Spur Gear
113 Washer
114 Nut
115 Spring
116 Bushing
117 Notch
118 Thread
120 Cassette Sub-Assembly
121 Body of Cassette Sub-Assembly
122 Recess
123 Through Hole of Recess
124 Screw
125 Linear Track
126 Screw
127 Washer
128 Rail
129 Groove
130 Shaft
131 Spur Gear
132 CirClip
133 Washer
134 Channel for Shaft
135 Hex Formation
136 Thread
140 Brake Arm Sub-Assembly
141 Body
142 Brake Arm
143 Follow Nut
144 Threaded Channel
145 Linear Track
146 Screw
147 Magnet Housing
148 Rail
149 Groove
150 Backing Plate
152 Cap Screw
160 Friction Brake
162 Brake Pad
170 Radial Direction
180 Magnet
203 Flywheel
240 Brake arm sub-assembly
290 Non-ferrous metal band

DETAILED DESCRIPTION OF THE EMBODIMENTS

The different aspects of the various embodiments can now be better understood by turning to the following detailed description of the embodiments, which are presented as illustrated examples of the embodiments as defined in the claims. It is expressly understood that the embodiments as defined by the claims may be broader than the illustrated embodiments described below.

In one aspect of the disclosure, a magnetic brake is provided that operates differently from those known in the prior art. As will be discussed in more detail below, the associated linear tracking system allows a direction of travel that offers optimal range of resistance curve ideal for indoor cycling. In another aspect of the disclosure, an indoor cycling having such novel magnetic brake is provided. In yet another aspect of the disclosure, this invention relates to any exercise equipment using a flywheel and a magnetic brake.

Referring now to FIG. 1, an exercise bike 100 is provided having a head tube 101, a down tube 102, and a flywheel 103 disposed between a fork 108, and a resistance knob 110. The flywheel can have a perimeter weight 105 and has an axis of rotation 104. The resistance knob 110 is attached to the down tube 102. On the bottom side 109 of the down tube 102 is attached the novel magnetic brake system which can include a cassette sub-assembly 120, and a brake arm sub-assembly 140.

Figure 2:
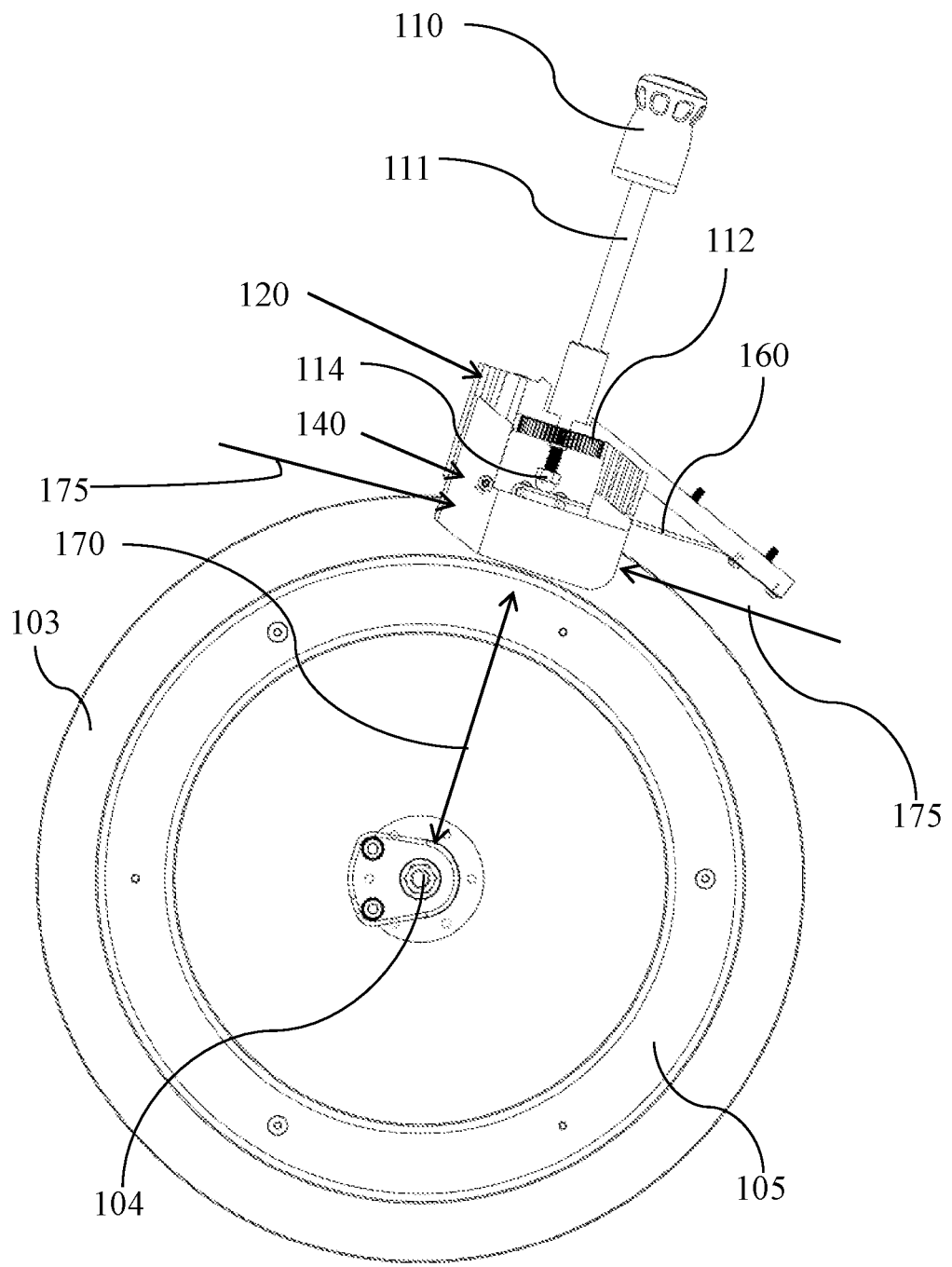
FIG. 2 shows a close-up left side view of the embodiment of the magnetic brake of FIG. 1 where the magnetic brake has moved into a braking position, and where the bike frame has been removed for easier illustration.

In FIG. 2, a close-up view of the magnetic brake system shows a resistance knob 110 connected to a control rod 110. As typically found in prior art indoor cycles, the resistance knob 110 is accessible to a rider. A rider could rotate the resistance knob 110 to adjust resistance to the flywheel 103.

Here, the control rod 110 is attached to a spur gear 112, and the bottom terminal end of the control rod 110 can be capped with a nut 114. The bottom terminal end of the control rod 110 can also have other configurations and may not have a nut 114.

Control rod 110 can be held in place by having control rod inserted through a recess 122 which can be an integral part of the cassette sub-assembly 120. As will be discussed later, recess 122 can be inserted through an opening 107 at the bottom of the down tube 102, thereby anchoring the cassette sub-assembly to the down tube 102. Once anchored, the cassette sub-assembly remains stationary with the down tube 102. As will be discussed in more detail later, the control rod 110, on the other hand, is capable of rotating and moving in a linear fashion relative to the cassette sub-assembly 120.

What's also shown in FIG. 2 is a brake arm sub-assembly 140 slidably attached to the cassette sub-assembly 120. Brake arm sub-assembly 140 is capable of moving, or sliding, in a linear fashion that is substantially the same as the radial direction 170 of the flywheel 103. In FIG. 2, the brake arm sub-assembly 140 is shown in a braking position where the brake arm sub-assembly envelops or overlaps with the perimeter of the flywheel 103. In one embodiment, this is as far as the braking arm sub-assembly would travel in a distal direction towards the axis 104 of the flywheel 103. In another embodiment, the maximum radial distance of this overlap is substantially the same as the diameter of one magnet 180 (as shown in FIG. 3).

Figure 3:
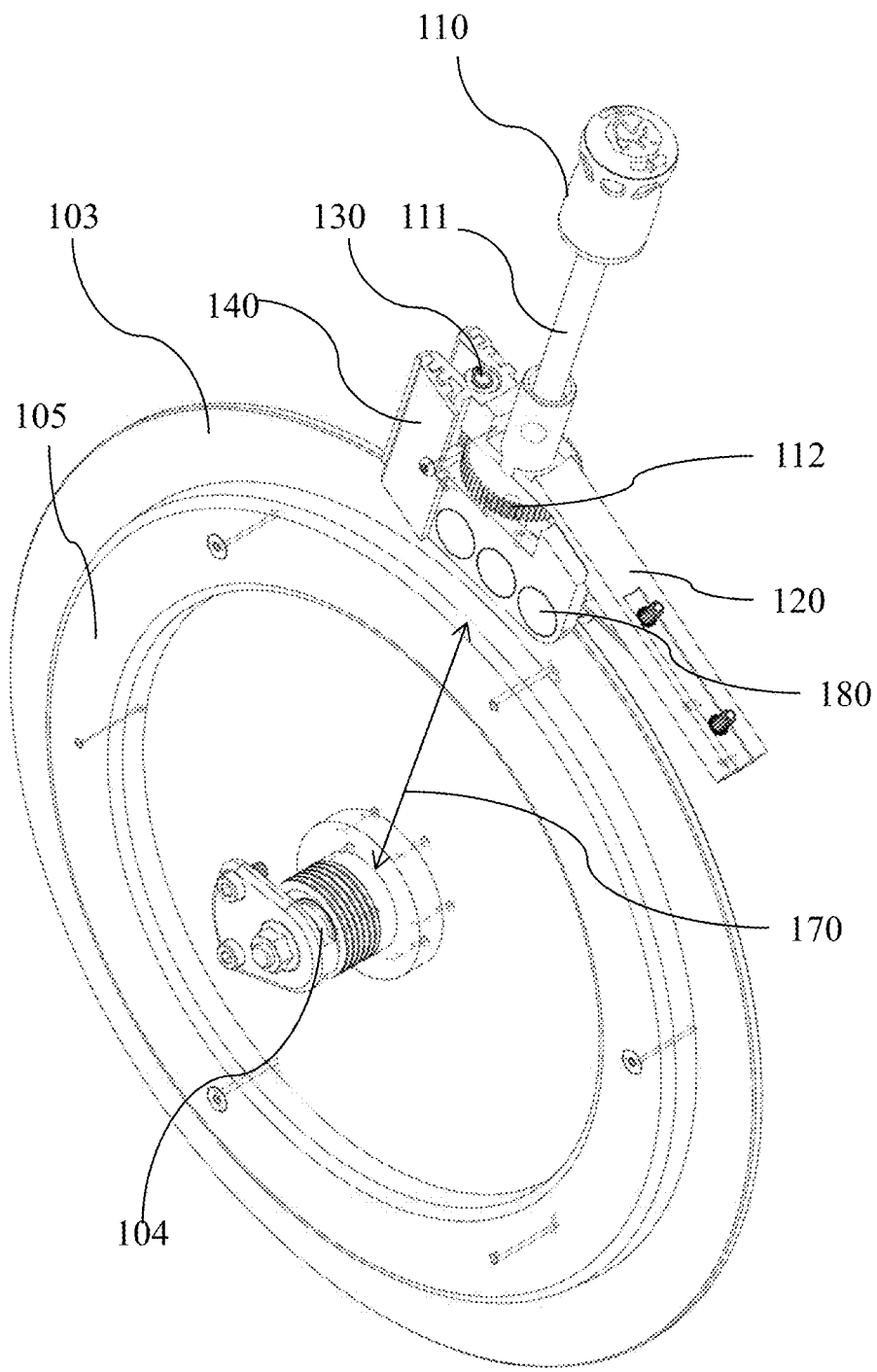
FIG. 3 is a close-up top perspective view of the embodiment of FIG. 2, according to one aspect of the disclosure.
Figure 13:
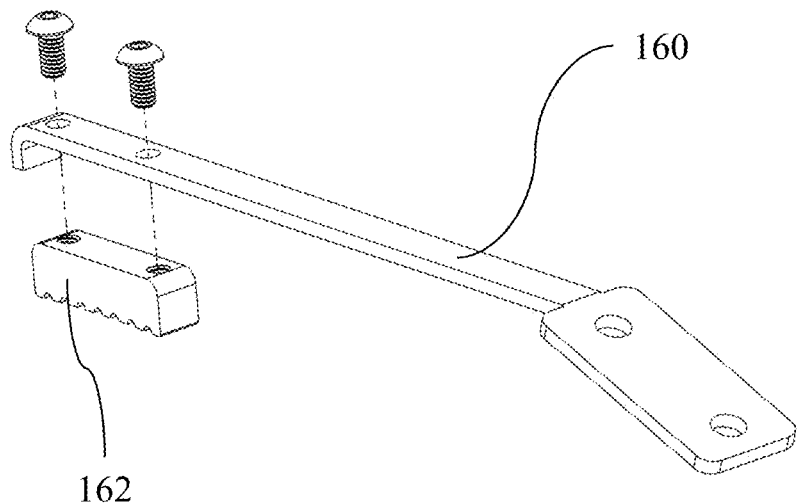
FIG. 13 is a close-up perspective view of one embodiment of the friction brake with a brake pad, according to one aspect of the disclosure.
Figure 14:
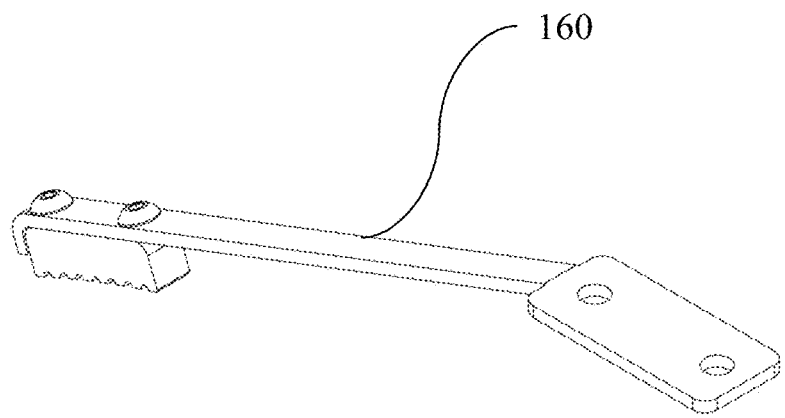
FIG. 14 is a close-up perspective view of one embodiment of the friction brake having the brake pad installed, according to one aspect of the disclosure.

Referring now to FIG. 3, backing plates 150 (see FIG. 5) of the brake arm sub-assembly have been removed for better illustration. Here, the control rod 111 is disposed within the recess 122 of the cassette sub-assembly 120. The recess 122 can be in the form of a tubular structure as shown, having an internal through hole. When a user rotates the resistance knob 110, the control rod 110 also turns which rotates the spur gear 112. As will be discussed later, a user may also press down on the resistance knob 110 to effectuate an emergency friction brake 160 (see FIGS. 13, 14).

This top perspective view also shows the rail and groove engagement of linear tracks, which can be found on both the cassette sub-assembly 120 and the brake arm sub-assembly 140.

Figure 4:
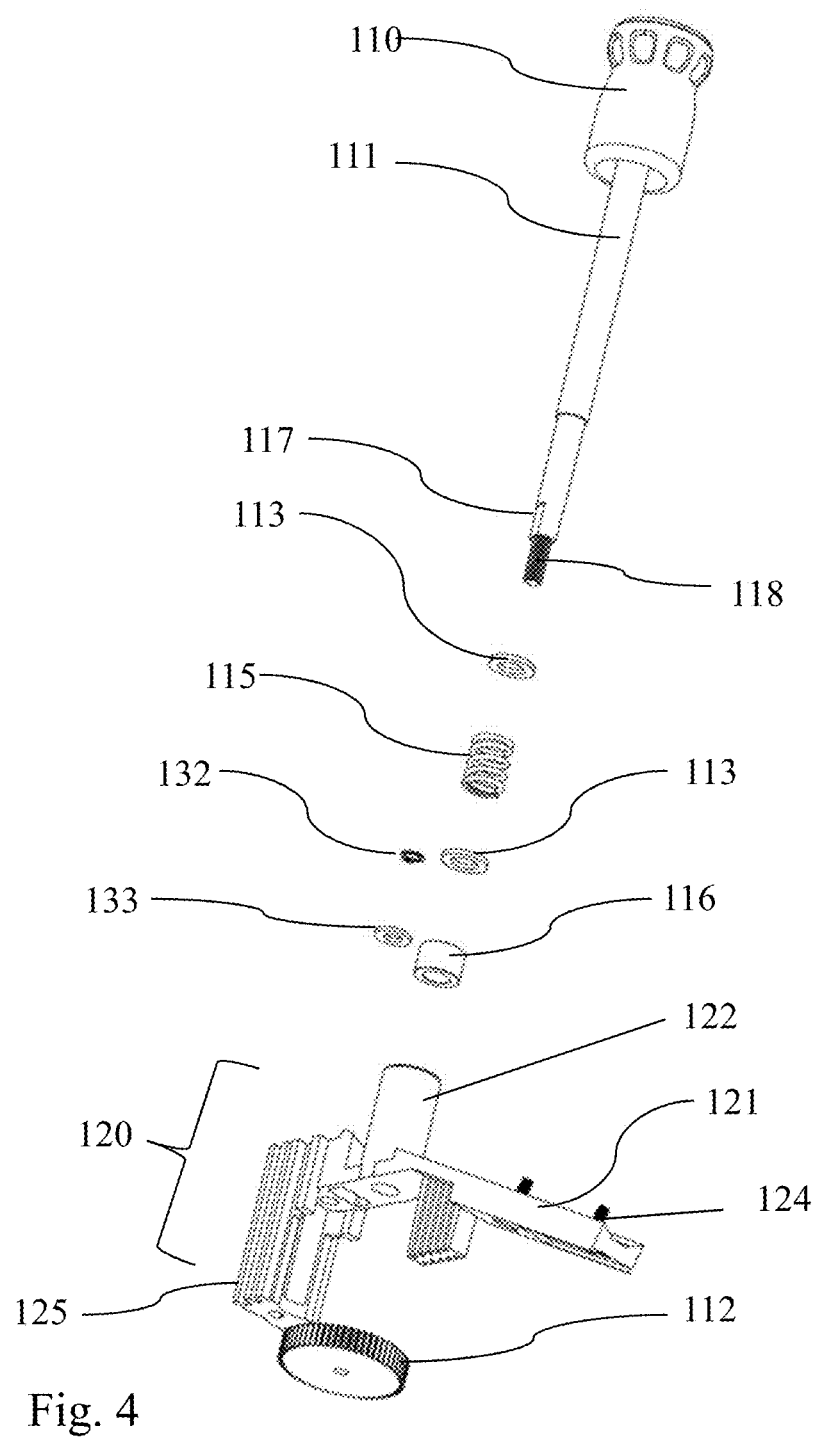
FIG. 4 is a close-up exploded view of the resistance knob, control rod, and the cassette sub-assembly, according to one aspect of the disclosure.

In FIG. 4, various contemplated components are shown that could fit within the cassette sub-assembly 120. The resistance knob 110 is disposed at the top terminal end of the control rod 110. The opposite end of the control rod 110 can have a notch 117 and a thread 118. The notch 117 can make abutting engagement with a spur gear 112, locking the spur gear 112 in place with the control rod 110. In this way, rotation of the control 111 also rotates the spur gear 112. The spur gear 112 may be fastened onto the control rod 111 in an axial position via an O-ring (not shown), a circlip (not shown), a transverse peg (not shown), or any other similar mechanical fasteners. Spur gear 112 is to stay fixed in an axial direction such that when a user pushes down on the resistance knob 110, the spur gear 112 would move in a downward direction along with the control rod 111. In some other embodiments, the spur gear 112 is not fixed to the control rod 111 in the radial direction such that when a user pushes down on the resistance knob 110, the spur gear 112 does not move in a downward direction along with the control rod 111.

The control rod 111 may be inserted through a washer 113, a spring 115, another washer 113, and a bushing 116. There can be provided multiple bushings 116 of various heights to accommodate user preference. Having bushing 116 can allow versatility in resistance adjustment during maintenance.

The washers 113, bushing 116, and spring 115 all fit within the recess 122. The control rod 111 can insert through the recess 122 and extend out from the through hole 123 (see FIG. 5) of the recess 122.

The cassette sub-assembly 120 has body 121 which can be fastened to the down tube 102 via two screws 124. On the head-end of the body 121 of the cassette sub-assembly 120, the body 121 can be fastened to the head tube 101 via screw 126 and washer 127 (see FIGS. 5, 7).

Figure 5:
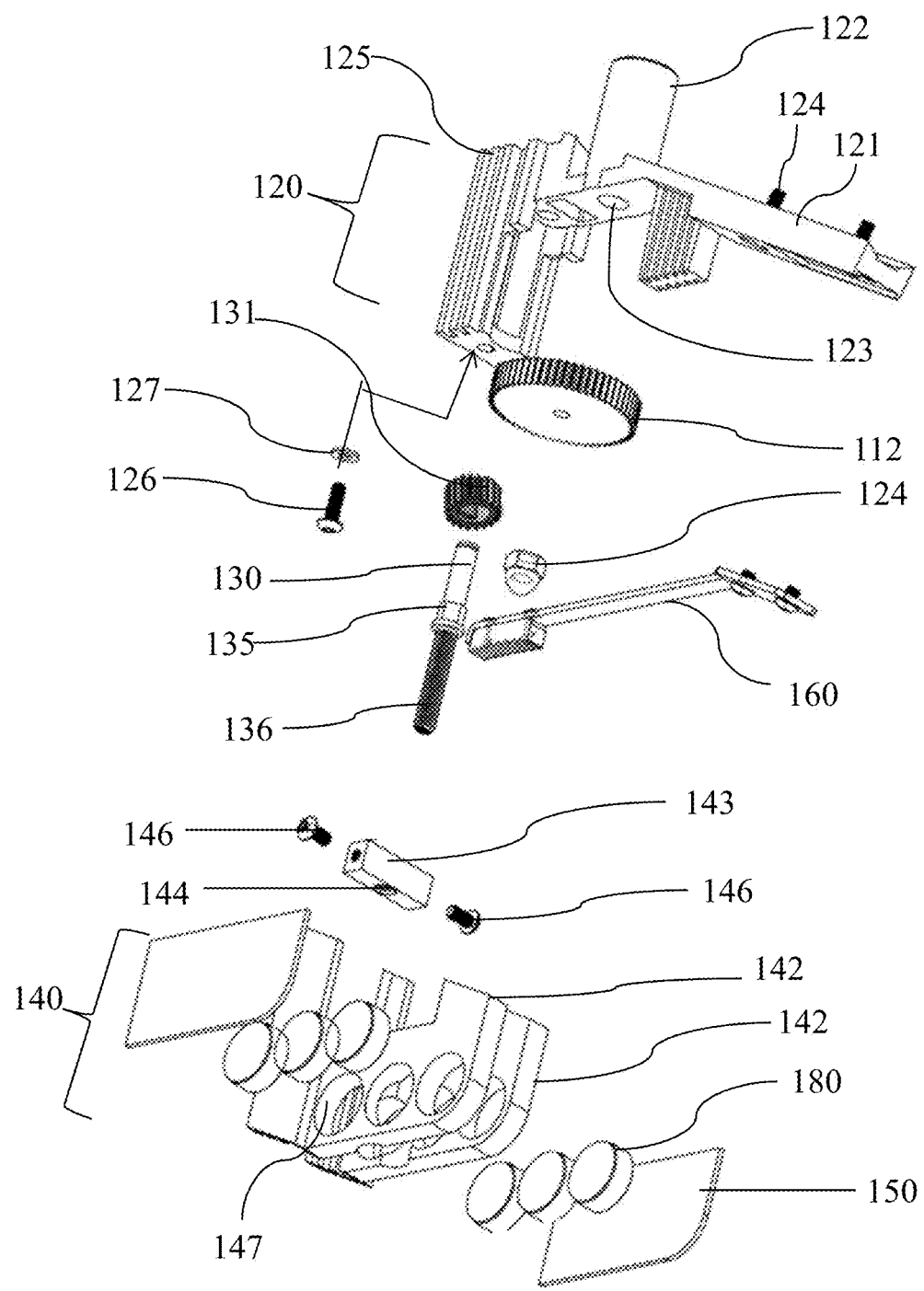
FIG. 5 is a continuation of FIG. 4 showing assembling of the cassette sub-assembly to the brake arm sub-assembly and to the shaft, according to one aspect of the disclosure.

Referring now to FIG. 5, which shows a bottom continuation of what's shown in FIG. 4. Here, the cassette sub-assembly 120 can have a linear track 125 disposed on the head-end of the body 121. The purpose of the linear track 125 is to guide a linear sliding action of the brake arm sub-assembly 140. It should be noted that the location of the linear track 125 can various. In other embodiments, the liner track 125 can be located in the mid-section of the body 121, or near the tail-end of the body 121.

The spur gear 112 makes engaging contact with a smaller spur gear 131. Smaller spur gear 131 can have a corresponding internal hexagonal shape to fittingly fasten to the hex formation 135 of shaft 130. There can be other ways to fasten the smaller spur gear 131 to the shaft 130, such as by screw or other known fasteners or couplers. The top terminal end of the shaft 130 can insert through the bore hole 134 (see FIG. 5) and extend out from the top side of the bore hole 134 (see FIG. 6). The top terminal end of the shaft 130 can be locked against a downward movement by the use of a circlip 132 and washer 133 (see FIG. 6).

Once the shaft 130 is locked against a downward movement in a radial direction 170, the smaller spur gear 131 could remain also in place against movement in a radial direction 170. This does not prevent the smaller spur gear 131 from rotating. In fact, when spur gear 112 turns the smaller spur gear 131, the entire shaft 130 rotates as well.

Referring now to the brake arm sub-assembly 140, of which an embodiment is shown on the bottom of FIG. 5. Here, the brake arm sub-assembly 140 can have two parallel brake arms 142. Each of the two parallel brake arms 142 can have magnet housing 147 to enclose magnets 180. In the embodiment shown, there are three circular disc-shaped magnets (equal in size) housed in each of the two parallel brake arms 142. Magnet 180 can include rare earth magnets such as K&J Magnetics part #DX06-N52. Other magnets with equivalent properties may also be used.

In one particular embodiment, each magnet 180 has one inch diameter and ⅜ inch thickness. The tolerances of each are plus/minus 0.004"×0.004". One contemplated magnetic is NdFeB, grade N52. The magnets may or may not have Ni—Cu—Ni (Nickel) coating/plating. Each magnet 180 can have an axial magnetization direction (poles on flat ends). Further, each magnet 180 can have a surface field of 4440 Gauss.

In one contemplated embodiment, magnets 180 are glued with epoxy into the magnet housing 147. Alternatively or optionally, other fastening means may be used.

On the outside of the magnets 180 there can be backing plates 150 to cover up the magnet housings 147.

In one particular embodiment, there is provided a follow nut 143 to be separately and detachably fastened to the brake arm sub-assembly 140 via two screws 146. As will be discussed later, follow nut 143 (FIG. 11) engages with the bottom thread 136 of the shaft 130 and allows the brake arm assembly 140 to move linearly in a radial direction 170.

Figure 6:
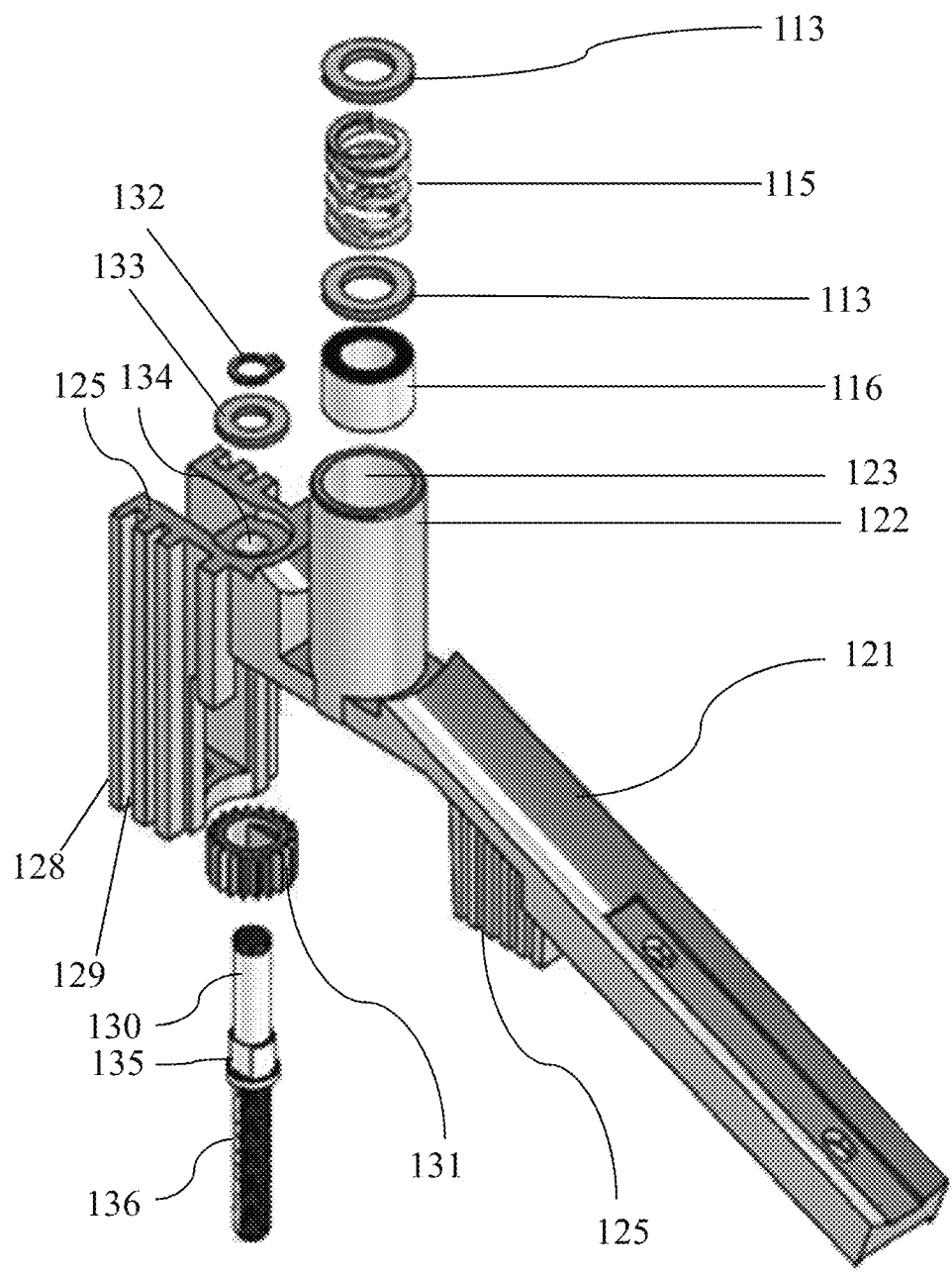
FIG. 6 is a close-up exploded view of the brake arm sub-assembly of FIG. 11, according to one aspect of the disclosure.

In FIG. 6, there can be two parallel linear tracks 125, one on the left side and one on the right side. Each of the linear tracks 125 can have multiple parallel rails 128 and multiple parallel grooves 129. In one embodiment, the multiple parallel rails 128 and multiple parallel grooves 129 span through the entire length of the linear track 125 in a radial direction 170. In one embodiment, the multiple parallel rails 128 and multiple parallel grooves 129 are open ended at the bottom end of the linear track 125.

Figure 7:
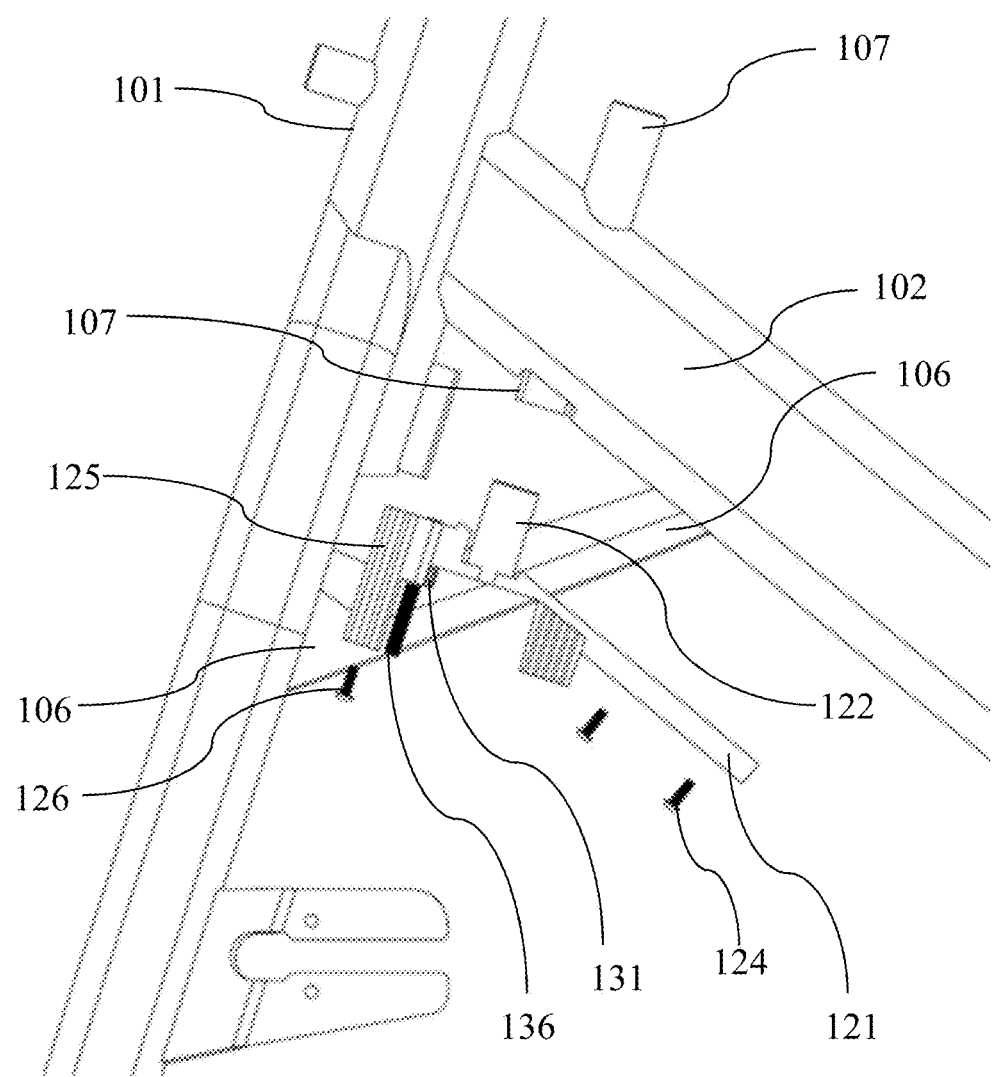
FIG. 7 is a close-up left side view of one embodiment showing the cassette sub-assembly being installed onto a bike frame.

Referring now to FIG. 7, down tube 102 is connected to bike frame 106. The down tube 102 can have a hole 107 or a guiding tube that receives the recess 122 of the cassette sub-assembly 120. FIG. 7, illustrates an easy assembly method where the cassette sub-assembly 120 is to have the shaft 130 and smaller spur gear 131 installed onto the cassette sub-assembly 120, before fastening the cassette sub-assembly 120 to the down tube 102. The cassette sub-assembly can be fastened to the down tube 102 via screws 124, and fastened to the head tube 101 via screw 126.

Figure 8:
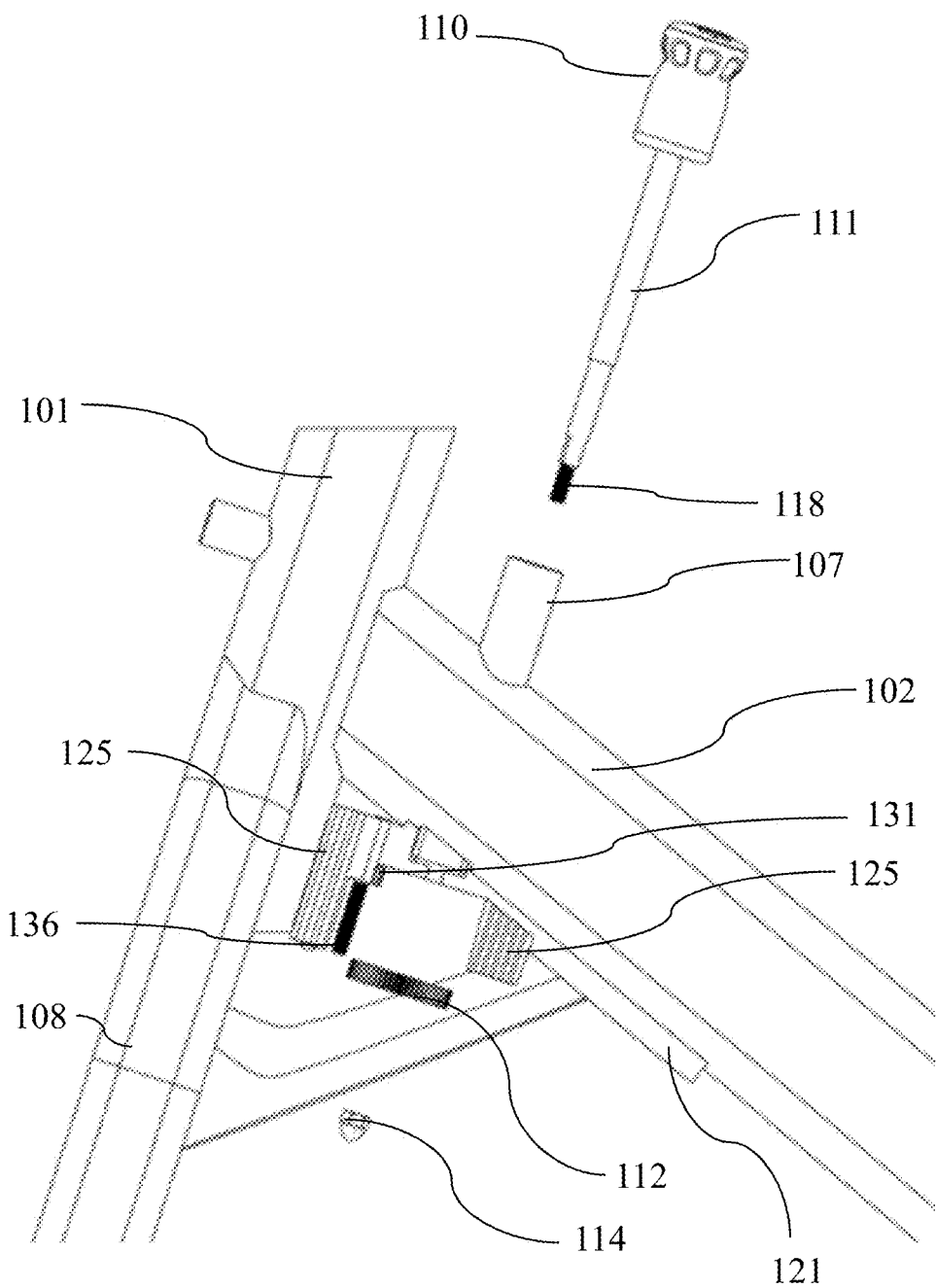
FIG. 8 is a close-up left side view of the embodiment of FIG. 6, showing the cassette sub-assembly already installed onto a bike frame.

In FIG. 8, after the cassette sub-assembly 120 is fastened to the head tube 101 and down tube 102, the control rod 111 is inserted into the hole 107 of the down tube 102 and extending out from the through hole 123 (FIG. 5) of recess 122. The bottom end of the control rod 111 connects with the spur gear 112 as previously discussed, and the bottom end can be capped with a nut 114. Note that the optional washers 113, spring 115, and bushing 116 have been inserted down into the hole 107 thus not shown in FIG. 8.

Figure 9:
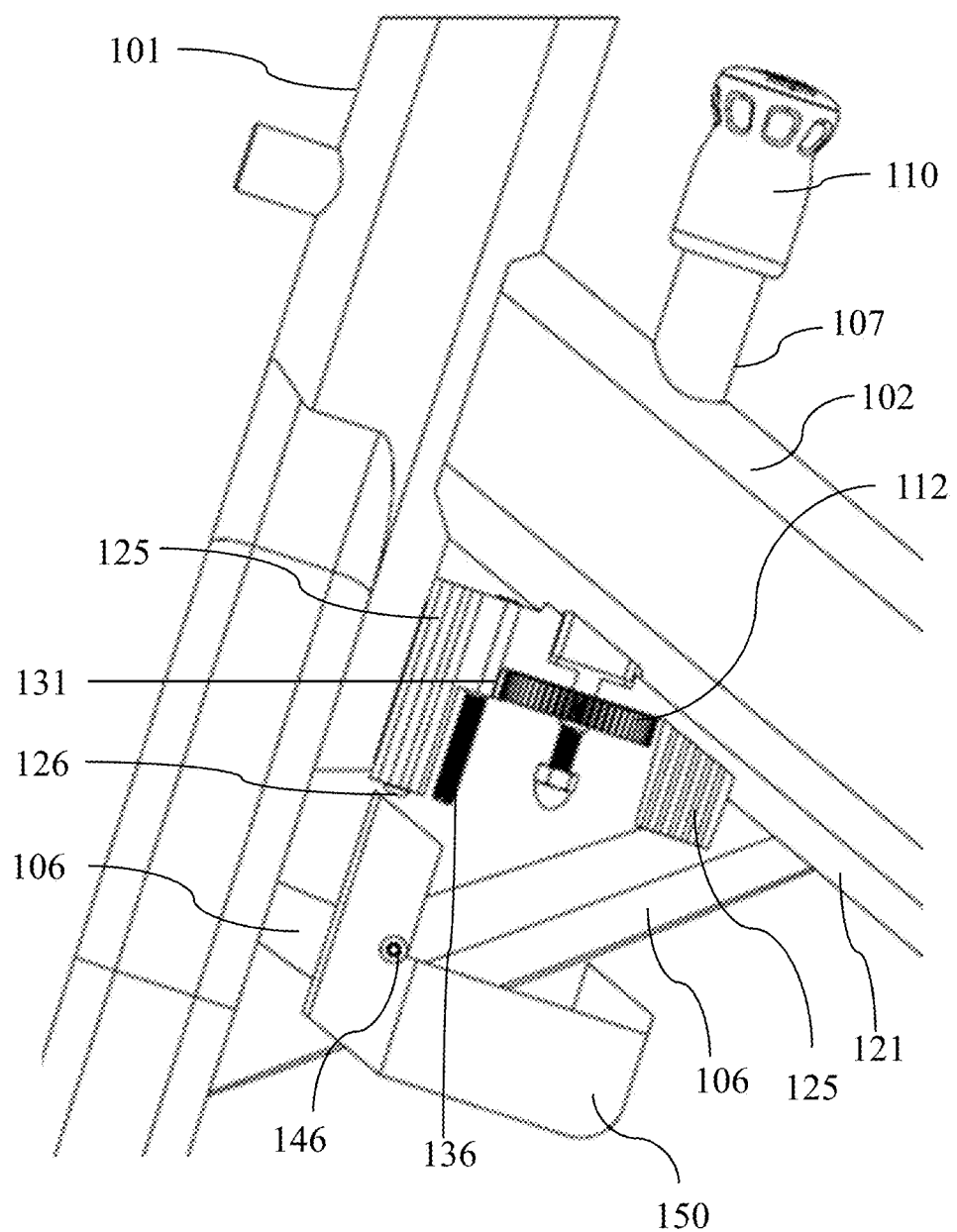
FIG. 9 is a close-up left side view of the embodiment of FIG. 7, showing the brake arm sub-assembly being installed onto the cassette sub-assembly.
Figure 10:
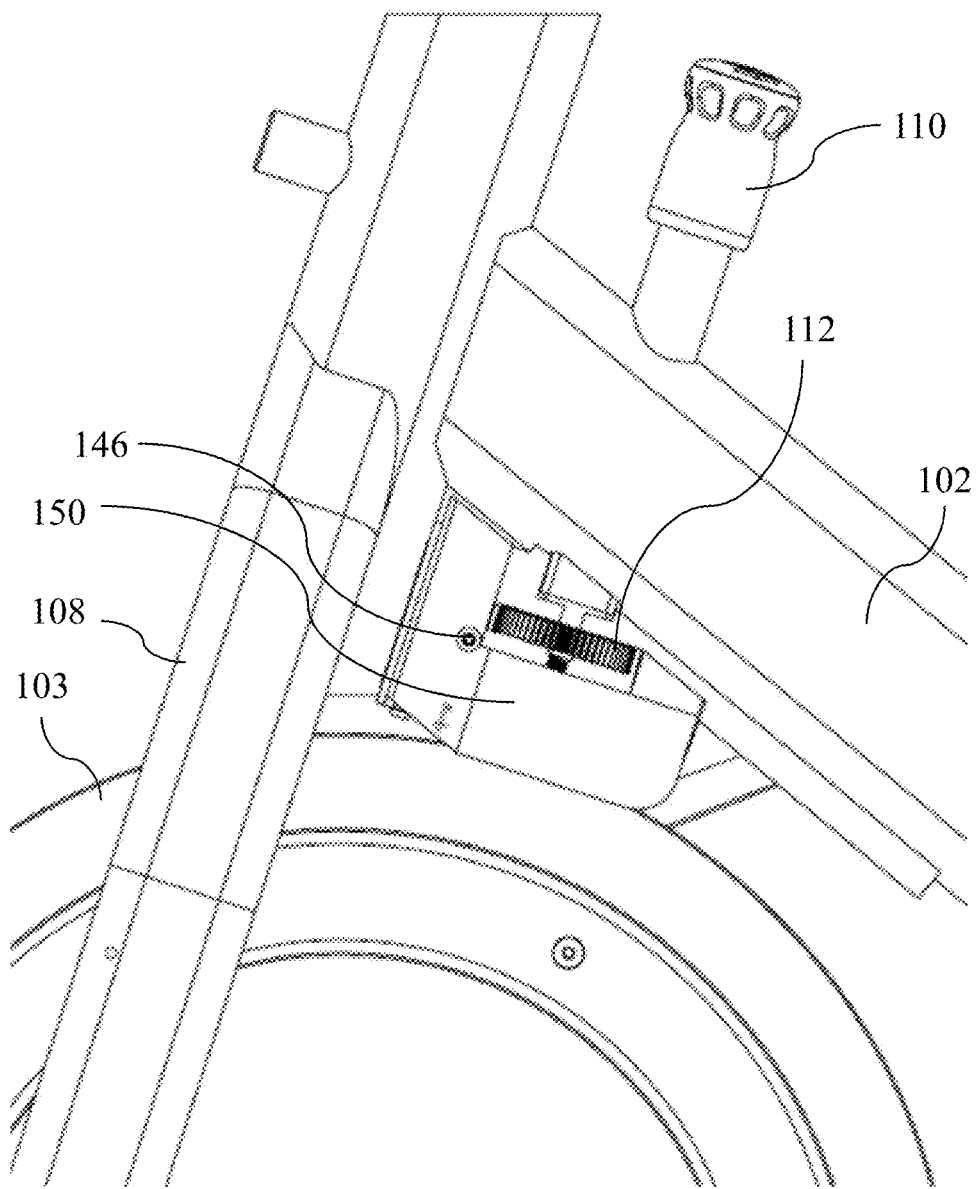
FIG. 10 is a close-up left side view of the embodiment of FIG. 8, showing the brake arm sub-assembly already installed onto the cassette sub-assembly.

Now in FIG. 9, the spur gear 112, the nut 114, and the control rod 111 (not shown) are assembled in place, and the brake arm assembly 140 can slide into place along the linear track 125. Note that there can also be provided an optional linear track 125 on the tail-end of the cassette sub-assembly 120. In FIG. 10, the brake arm assembly 14 is fully received.

Figure 11:
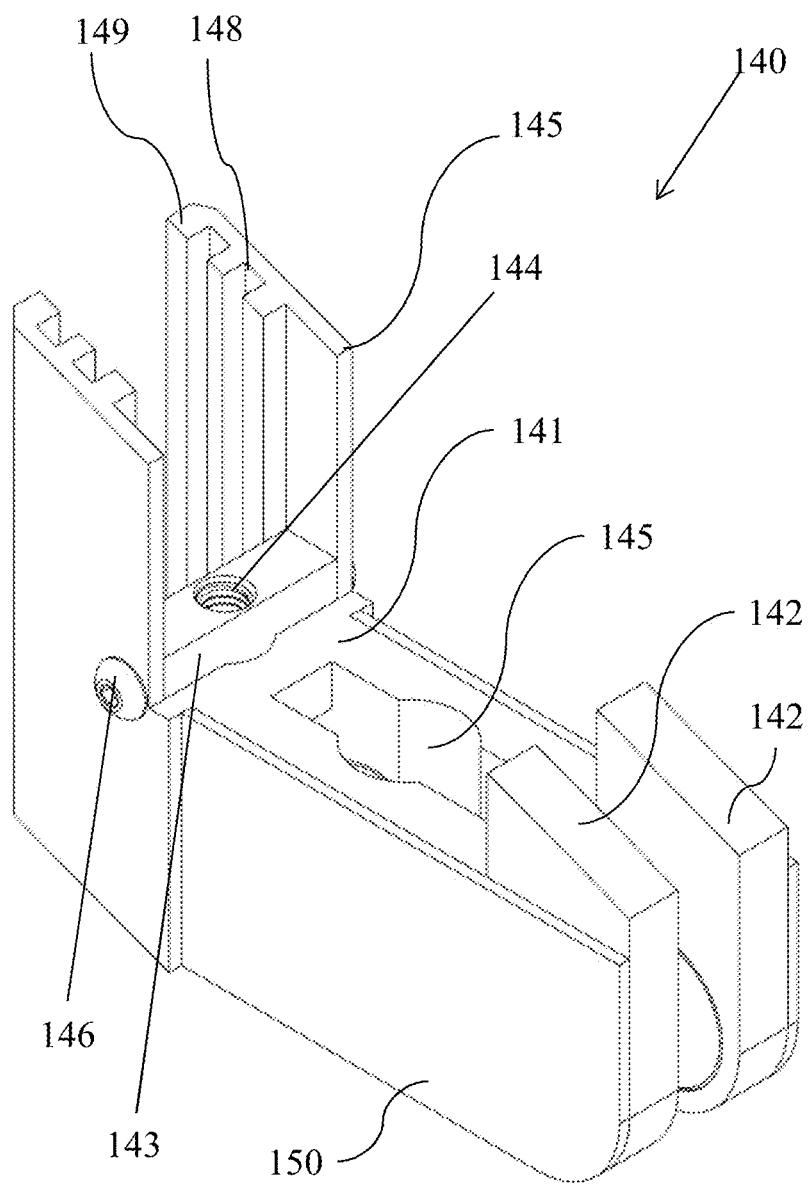
FIG. 11 is a close-up perspective view of the brake arm sub-assembly, according to one aspect of the disclosure.
Figure 12:
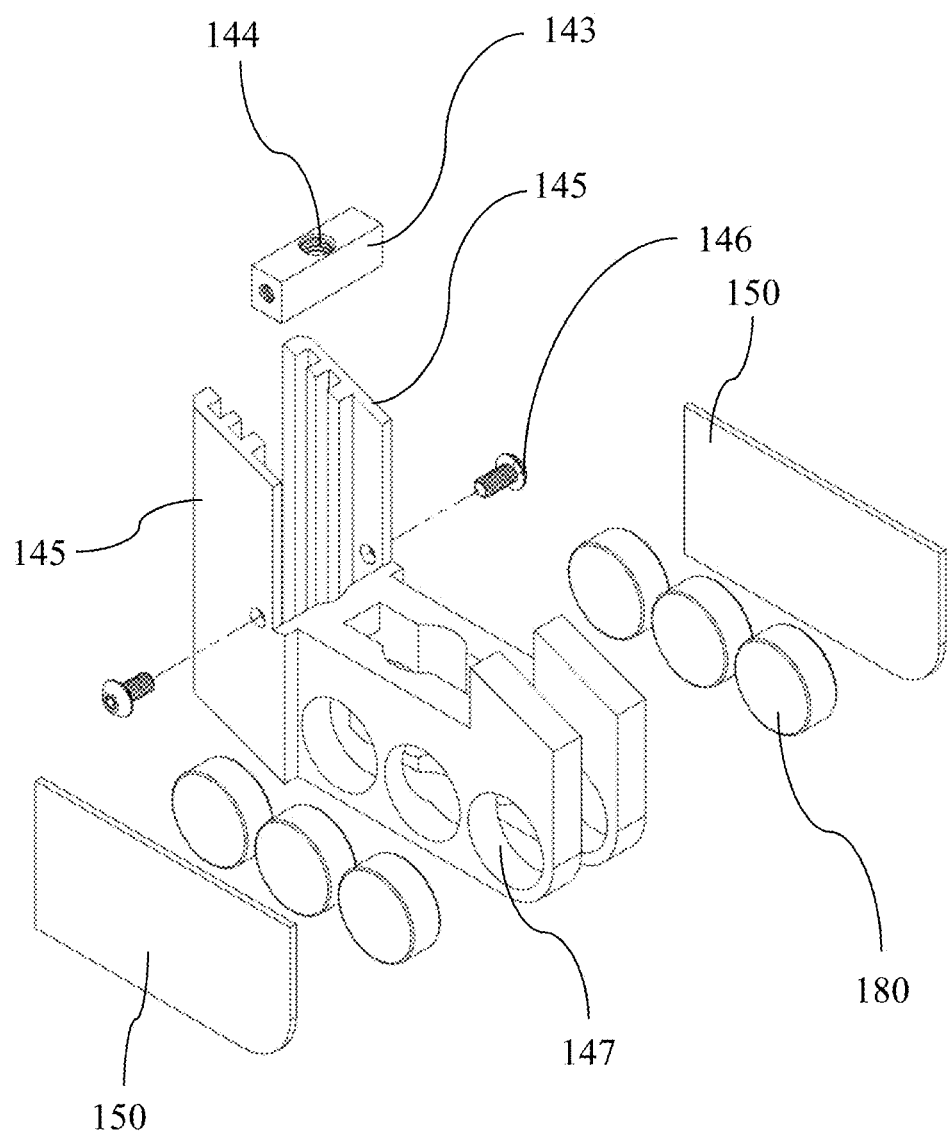
FIG. 12 is a close-up exploded view of the cassette sub-assembly along with various other components received within it.

Referring now to FIGS. 11 and 12, the brake arm sub-assembly 140 has a body 141 that can have a pair of parallel arms 142 spaced apart from each other. The parallel arms 142 are each disposed on a side of the flywheel 103 opposite to each other. In between the two parallel arms 142 can be a gap 145, which can be a space that is empty through from top to bottom. The gap 145 can take any shape. What is shown is a configuration of a straight channel that allows the containment and passage of a friction brake 160 (see FIGS. 13, 14). In one embodiment, the friction brake 160 is disposed in the gap 145 at rest. When the nut 114 of the control rod 111 moves downward to bias the friction brake 160, the brake pad 162 (see FIGS. 13, 14) makes frictional contact with the flywheel 103.

As discussed earlier, the follow nut 143 can be fastened to the body 141 via side screws 146. The follow nut 143 has a threaded channel 144 that engages with the thread 136 of shaft 130. When the shaft 130 rotates, its thread 136 moves the follow nut 143 in a radial direction 170, which in turn moves the entire brake arm sub-assembly 140 linearly in the radial direction 170. The modular design of the follow nut 143 and brake arm sub-assembly 140 can provide easy assembly for less skilled technicians. Also, this design can allow easy and economical maintenance on replacement parts.

In FIG. 11, there can be two parallel linear tracks 145, one on the left side and one on the right side. Each of the linear tracks 145 can have multiple parallel rails 148 and multiple parallel grooves 149. In one embodiment, the multiple parallel rails 148 and multiple parallel grooves 149 span through the entire length of the linear track 145 in a radial direction 170. In one embodiment, the multiple parallel rails 148 and multiple parallel grooves 149 are open ended at the bottom end of the linear track 145.

FIGS. 15-18 illustrate another implementation of the disclosure where a flywheel 203 having a flat non-ferrous metal band 290 is provided. The flywheel 203 can have a non-ferrous metal band 290 attached to its outer perimeter. A brake arm sub-assembly 240 can have a plurality of magnets 180 (see FIGS. 16, 17, 18) disposed on the underside of the brake arm sub-assembly 240. The underside can have an arcuate shape. In some embodiments, this arcuate shape has a degree of curvature substantially equal to the degree of the perimeter curvature, as defined by the flat non-ferrous band 290.

Each of the plurality of magnets 180 can have a flat end and an axial magnetization direction (poles on flat ends). Each magnet 180 can be glued or otherwise attached on the arcuate surface with its flat end in a plane substantially parallel with a plane of the non-ferrous metal band of the flywheel (see FIG. 16).

The brake arm sub-assembly 240 can be slidably attached to the cassette sub-assembly 120 in similar ways previous mentioned. As such, brake arm sub-assembly 240 is capable of linearly moving in a radial direction 170 relative to the axis of the flywheel 203.

Figures 15, 16:
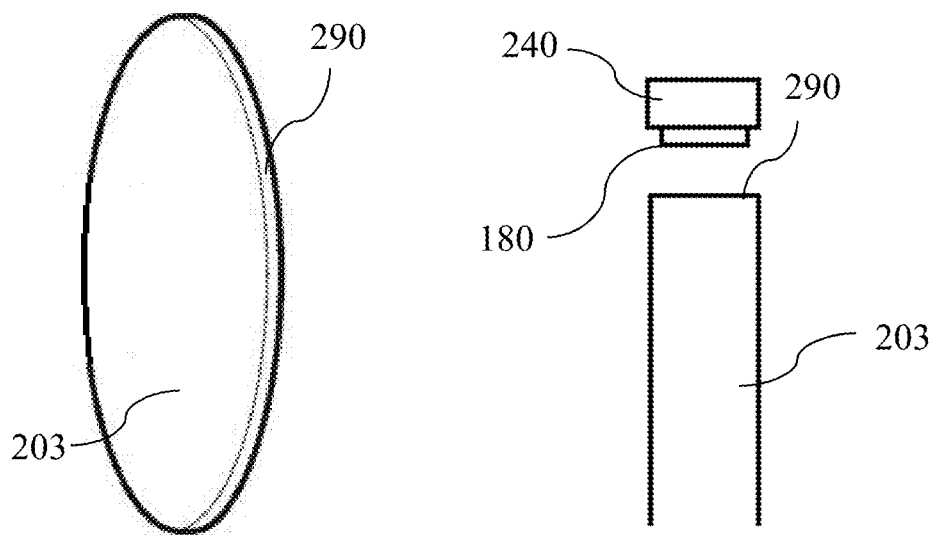
FIG. 15 is a perspective view of another embodiment using a flywheel having a flat non-ferrous outer band.
FIG. 16 is a cross-sectional view of one embodiment of the brake arm sub-assembly disposed above the flywheel having a flat non-ferrous outer band.
Figure 17:
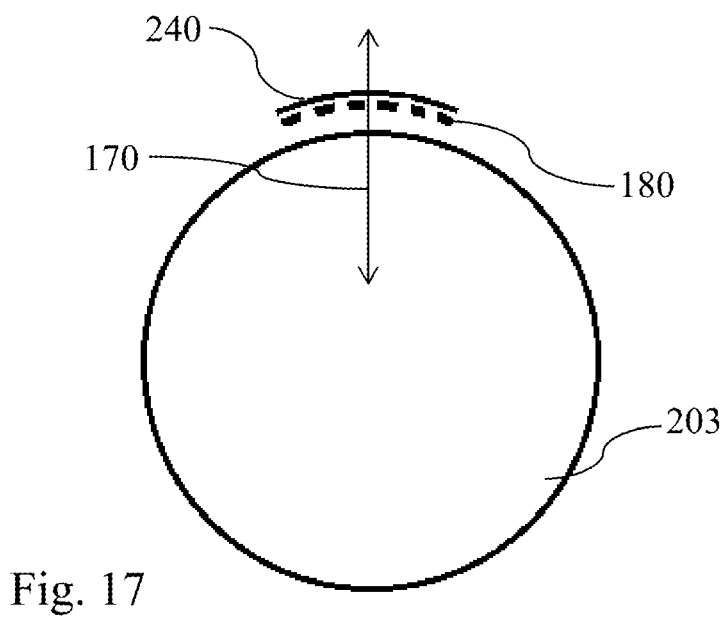
FIG. 17 illustrates the embodiment of the brake arm sub-assembly of FIG. 16 with possible movement in the radial direction.
Figure 18:
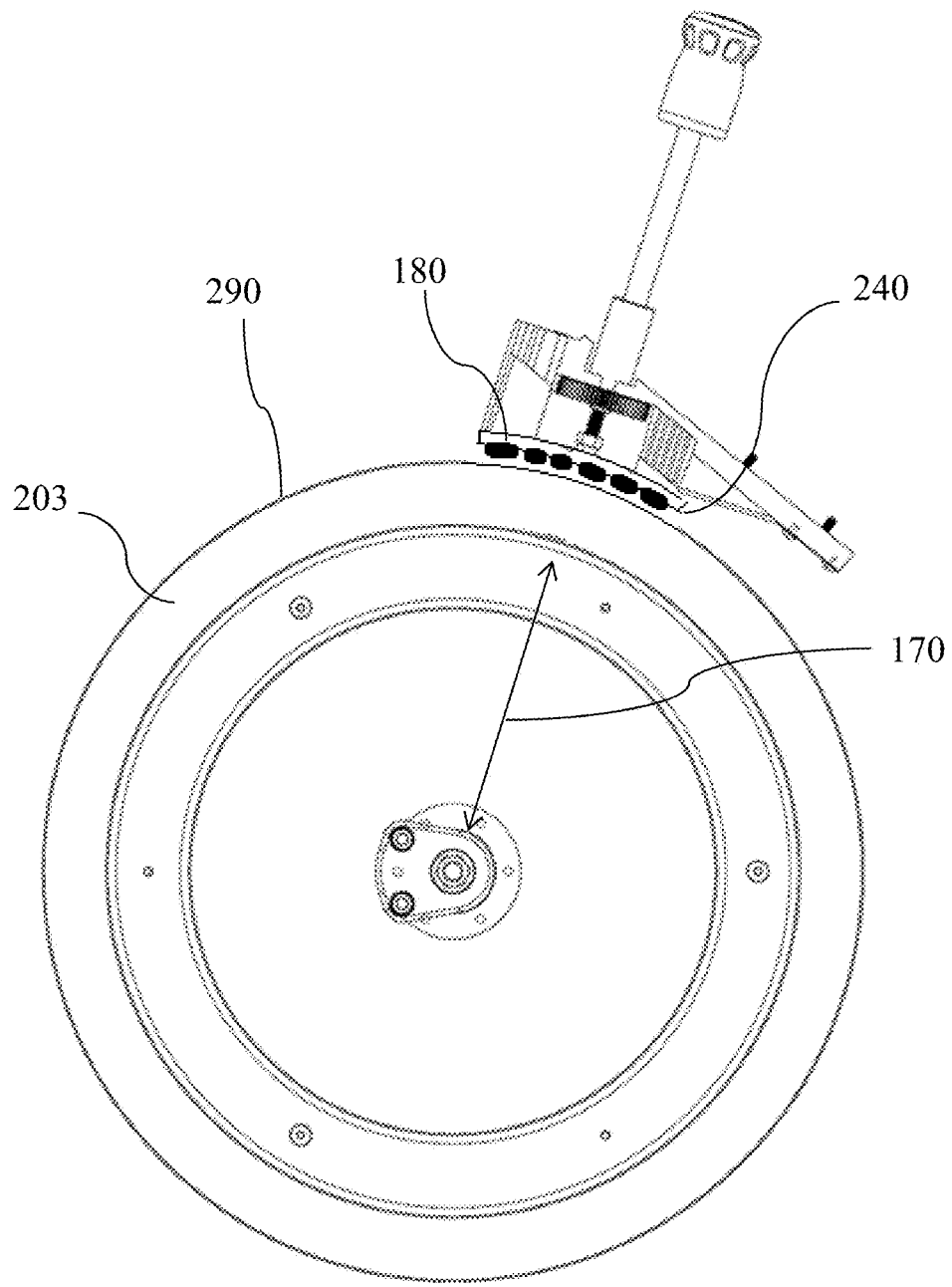
FIG. 18 shows the embodiment of the brake arm sub-assembly of FIG. 16 being coupled to the cassette sub-assembly.

In one embodiment, the plurality of magnets 180 in FIGS. 16-18 are capable of moving in the radial direction 170 towards the axis of the flywheel 203 and does not physically contact the non-ferrous metal band 290.

A number of implementations have been described. Nevertheless, it will be understood that various modifications may be made without departing from the spirit and scope of the disclosure. For example, operations, methods, or processes described herein may include more steps or fewer steps than those described. Further, the steps in such example operations, methods, or processes may be performed in different successions than that described or illustrated in the figures. Accordingly, other implementations are within the scope of the following claims.

Thus, specific embodiments and applications of a magnetic brake system have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C and N, the text should be interpreted as requiring at least one element from the group which includes N, not A plus N, or B plus N, etc.

What is claimed is:

1. An exercise machine comprising:
    a main frame having a head tube and a down tube, where the head tube is connected to the down tube;
    a weighted flywheel attached to the main frame, wherein the weighted flywheel has an axis;
    a magnetic brake cassette sub-assembly attached to the main frame, wherein the magnetic brake cassette sub-assembly has a first linear track;
    a brake arm sub-assembly has a second linear track to slidably attach to the first linear track;
    wherein the brake arm sub-assembly has a pair of parallel arms spaced apart from each other and each of the pair of parallel arms disposed on a side of the weighted flywheel opposite to each other;
    at least one magnet disposed on each of said pair of parallel arms; and
    the brake arm sub-assembly does not pivot relative to the main frame;
    the brake arm sub-assembly slides along said first linear track in a direction in line with a radial direction from the axis of the weighted flywheel.

2. The exercise machine as recited in claim 1, wherein said first linear track of the magnetic brake cassette sub-assembly has at least one of a track groove and a linear rail, the at least one of the track groove and the linear rail are in line with the radial direction from the axis of the weighted flywheel.

3. The exercise machine as recited in claim 2 further comprising a resistance knob connected to the down tube and is disposed above the down tube, the resistance knob is co-axially connected to a control rod such that when the resistance knob is turned, the control rod is in turn rotated.

4. The exercise machine as recited in claim 3 further comprising a first spur gear co-axially disposed on the control rod, and wherein the control rod extends through the downtube and through a first recess of the magnetic brake cassette sub-assembly, wherein the first spur gear is disposed below the first recess.

5. The exercise machine as recited in claim 4 further comprising a shaft disposed through a second recess of the magnetic brake cassette sub-assembly, and a second spur gear is co-axially disposed on the shaft, wherein the second spur gear is matingly coupled to the first spur gear such that rotating of the control rod also rotates the shaft.

6. The exercise machine as recited in claim 5 further comprising a thread disposed on the shaft, and the thread is matingly coupled to a receiving thread on the brake arm sub-assembly such that rotating the shaft causes the brake arm sub-assembly to move in a direction in line with the radial direction.

7. The exercise machine as recited in claim 6 further comprising a resilient brake arm having a proximal end attached to the magnetic brake cassette sub-assembly and a distal end having a brake pad.

8. The exercise machine as recited in claim 7, wherein a bottom terminal end of the control rod is capable of making an abutting contact with the resilient brake arm and bending the resilient brake arm toward the weighted flywheel.

9. The exercise machine as recited in claim 8, wherein the resilient brake arm is disposed between the pair of parallel arms.

10. The exercise machine as recited in claim 5, wherein the first recess has an upwardly extending extrusion that fits within a hole disposed on a bottom side of the down tube.

11. The exercise machine as recited in claim 10, wherein the exercise machine is a stationary bicycle.

12. The exercise machine as recited in claim 5, wherein the shaft does not move in a linear direction.

13. The exercise machine as recited in claim 2, wherein said first linear track of the magnetic brake cassette sub-assembly has a third linear track disposed in parallel to the first linear track.

14. The exercise machine as recited in claim 13, wherein said second linear track of the brake arm sub-assembly has at least one of a track groove and a linear rail, the at least one of the track groove and the linear rail are in line with the radial direction from the axis of the weighted flywheel.

15. The exercise machine as recited in claim 14, wherein said second linear track of the brake arm sub-assembly has a fourth linear track disposed in parallel to the second linear track, and both are slidably disposed in between the first linear track and the third linear track.

16. An indoor bicycle comprising:
    a main frame having a head tube and a down tube, where the head tube is connected to the down tube;
    a weighted flywheel attached to the main frame, wherein the weighted flywheel has an axis and a non-ferrous metal band defining a perimeter curvature;
    a magnetic brake cassette sub-assembly attached to the main frame, wherein the magnetic brake cassette sub-assembly has a first linear track;
    a brake arm sub-assembly has a second linear track to slidably attach to the first linear track;
    wherein the brake arm sub-assembly has an arm with an arcuate surface with a degree of curvature equal to a degree of the perimeter curvature;
    a plurality of magnets disposed on said arcuate surface; and
    wherein the brake arm sub-assembly does not pivot relative to the main frame and is capable of linearly moving in a radial direction relative to the axis of the weighted flywheel.

17. The indoor bicycle of as recited in claim 16, wherein each of the plurality of magnets has a flat end and an axial magnetization direction (poles on flat ends), and wherein each of the plurality of magnets is disposed on the arcuate surface with its flat end in a plane parallel with a plane of the non-ferrous metal band of the weighted flywheel.

18. The indoor bicycle of as recited in claim 17, wherein the plurality of magnets are capable of moving in the radial direction towards the axis of the weighted flywheel and does not physically contact the non-ferrous metal band.

* * * * *